(12) United States Patent
Kim et al.

(10) Patent No.: US 8,324,888 B2
(45) Date of Patent: Dec. 4, 2012

(54) INDUCTIVE ANGLE SENSOR WITH IMPROVED COMMON MODE NOISE REJECTION AND SIGNAL PROCESSING METHOD OF THE SAME

(75) Inventors: Gi-Yeop Kim, Daejeon (KR); Kyu-Won Jung, Seoul (KR); Cho-Soo Lee, Daejeon (KR); Sung-Tae Kim, Daejeon (KR); Yong-Jin Kang, Daejeon (KR)

(73) Assignee: Truwin Co., Ltd. (KR)

( * ) Notice: Subject to any disclaimer, the term of this patent is extended or adjusted under 35 U.S.C. 154(b) by 289 days.

(21) Appl. No.: 12/866,447

(22) PCT Filed: Aug. 28, 2009

(86) PCT No.: PCT/KR2009/004842
§ 371 (c)(1),
(2), (4) Date: Aug. 5, 2010

(87) PCT Pub. No.: WO2011/025076
PCT Pub. Date: Mar. 3, 2011

(65) Prior Publication Data
US 2011/0260714 A1    Oct. 27, 2011

(51) Int. Cl.
*G01B 7/14*    (2006.01)
(52) U.S. Cl. .................................................. 324/207.15
(58) Field of Classification Search ........................ None
See application file for complete search history.

(56) References Cited

U.S. PATENT DOCUMENTS

2002/0196015 A1 * 12/2002 Zapf .................... 324/207.17
2008/0054887 A1    3/2008 Lee

FOREIGN PATENT DOCUMENTS

JP    2001-082915    3/2001
KR   10 2009 0023739 A    3/2009

* cited by examiner

*Primary Examiner* — Melissa Koval
*Assistant Examiner* — Trung Nguyen
(74) *Attorney, Agent, or Firm* — Blakely, Sokoloff, Taylor & Zafman

(57) ABSTRACT

The present invention provides an inductive angle sensor with improved common mode noise rejection and a signal processing method of the same, which can improve electromagnetic compatibility (EMC) characteristics and obtain an accurate output value by eliminating common mode noise. The signal processing method includes adding signals obtained from a pair of receiver coils by an adder, subtracting the signal obtained from one of the pair of receiver coils from the signal obtained from the other receiver coil by a subtracter, multiplying the value obtained from the adder by the value obtained from the subtracter by a first multiplier, multiplying the value obtained from the subtracter by itself by a second multiplier, and dividing the value obtained from the first multiplier by the value obtained from the second multiplier by a divider.

3 Claims, 2 Drawing Sheets

INDUCTIVE ANGLE SENSOR WITH IMPROVED COMMON MODE NOISE REJECTION AND SIGNAL PROCESSING METHOD OF THE SAME

This is a non-provisional application claiming the benefit of International application number PCT/KR2009/004842 filed Aug. 28, 2009.

TECHNICAL FIELD

The present invention relates to an inductive angle sensor with improved common mode noise rejection and a signal processing method of the same. More particularly, the present invention relates to an inductive angle sensor with improved common mode noise rejection and a signal processing method of the same, which can improve electro-magnetic compatibility (EMC) characteristics by effectively eliminating common mode noise and reduce manufacturing cost by reducing the number of substrates.

BACKGROUND ART

In general, in the case of a steering wheel, a fuel gauge, and various mechanical devices, it is important to measure an accurate value of a rotation angle so as to perform precise control. Therefore, an angle sensor is used to measure the rotation angle of a rotating object.

The angle sensor utilizes a technique of emitting and receiving light or a technique of using inductance of a coil.

As shown in FIG. 1, a conventional inductive angle sensor is configured by arranging a semicircular coupler 4 over an exciting coil 2 wound in a ring shape with a pair of receiver coils 6 and 8 interposed therebetween.

The first receiver coil 6 is used to obtain information on the rotation angle using a differential signal that varies when the coupler 4 rotates. The second receiver coil 8 is used to obtain information on the distance between the coupler 4 and a sensor substrate using a differential signal that varies according to a change in distance from the coupler 4.

Since the conventional inductive angle sensor uses the pair of receiver coils 6 and 8, at least two substrates are required, and thus the overall structure is complicated.

Moreover, as shown in FIG. 2, in the case of the conventional inductive angle sensor, a signal processor 10 is connected to the sensor to process the information (signals) obtained from the receiver coils 6 and 8, thus extracting necessary information.

The signal process performed by the signal processor 10 will be described below.

First, when an oscillation voltage Vosc, expressed by the following Math Figure 1, is applied from an oscillator connected to the exciting coil 2, a first received voltage Ax and a second received voltage Bx, expressed by the following Math Figures 2 and 3, are obtained from the first and second receiver coils 6 and 8.

MathFigure 1

$$Vosc = Vm \sin(wt) \quad \text{[Math. 1]}$$

MathFigure 2

$$Ax = A\sin(wt) + n(t) \quad \text{[Math. 2]}$$

MathFigure 3

$$Bx = B\sin(wt) + n(t) \quad \text{[Math. 3]}$$

In Math Figures 1 to 3, Vm, A, and B represent constants, respectively.

In Math Figures 2 and 3, n(t) represents common mode noise (noise->n(t)).

A first multiplier 12 of the signal processor 10 outputs a signal Ax·Bx obtained by multiplying the first voltage Ax of the first receiver coil 6 by the second voltage Bx of the second receiver coil 8, and the signal Ax·Bx can be expressed by the following Math Figure 4.

MathFigure 4

$$Ax \cdot Bx = AB\sin^2(wt) + (A+B)\sin(wt) \cdot n(t) + n^2(t) \quad \text{[Math. 4]}$$

Since $\sin^2(wt)$ is expressed by the following Math Figure 5 according to a trigonometric function equation, the above Math Figure 4 can be expressed by the following Math Figure 6.

MathFigure 5

$$\sin^2(wt) = \frac{1 - \cos(2wt)}{2} \quad \text{[Math. 5]}$$

MathFigure 6

$$Ax \cdot Bx = \frac{AB(1 - \cos(2wt))}{2} + (A+B)\sin(wt) \cdot n(t) + n^2(t) \quad \text{[Math. 6]}$$

When the signal obtained by Math Figure 6 is passed through a first low pass filter 14, all cos(2wt) and sin(wt) components are removed, and thus the above Math Figure 6 can be expressed by the following Math Figure 7.

MathFigure 7

$$Ax \cdot Bx = \frac{AB}{2} + N \quad \text{[Math. 7]}$$

In Math Figure 7, N is not 0 (N≠0) and is represented as N=$G_{LPF}$($n^2(t)$), and $G_{LPF}$ represents the transfer function of the low pass filter (LPF).

In the same manner, a second multiplier 13 of the signal processor 10 outputs a signal B·Bx obtained by multiplying the second voltage Ax of the second receiver coil 8 by itself, and when the signal is passed through a second low pass filter 15, all cos(2wt) and sin(wt) components are removed, which can be expressed by the following Math Figure 8.

MathFigure 8

$$Bx \cdot Bx = \frac{B^2}{2} + N \quad \text{[Math. 8]}$$

A divider 16 of the signal processor 10 outputs a value obtained by dividing the value obtained by the first multiplier 12 by the value obtained by the second multiplier 13, and the output value can be expressed by the following Math Figure 9.

MathFigure 9

$$\frac{Ax \cdot Bx}{Bx \cdot Bx} = \frac{AB + 2N}{B^2 + 2N} \quad \text{[Math. 9]}$$

In the signal processor 10, a third multiplier 18 obtains a final output value Vout by multiplying the value obtained by the above Math Figure 9 by a reference voltage Vref.

Therefore, in the case of the conventional inductive angle sensor, the common mode noise is not removed even when a ratio-metric is used in the signal processor 10 in the above manner, and thus the common mode noise rejection such as electromagnetic compatibility (EMC) characteristic is low.

While the first receiver coil 6 has a structure in which the differential signal varies when the coupler 4 rotates, the second receiver coil 8 has a structure in which the differential signal varies according to a change in distance from the coupler 4 regardless of the rotation of the coupler 4, and thus the shape and operational characteristics of the first and second receiver coils 6 and 8 are different from each other. Moreover, since the first and second receiver coils 6 and 8 do not vary in the same direction with respect to a change in voltage generated by the exciting coil 2 and induced noise, the change in voltage or the noise is not removed even when the divider 16 is used by the ratio-metric method.

The above information disclosed in this Background section is only for enhancement of understanding of the background of the invention and therefore it may contain information that does not form the prior art that is already known in this country to a person of ordinary skill in the art.

DISCLOSURE OF INVENTION

Technical Problem

The present invention has been made in an effort to provide an inductive angle sensor with improved common mode noise rejection, which has a simplified structure in which a pair of receiver coils are disposed symmetrically on both sides of a center line on a ring-shaped exciting coil to reduce the number of substrates, thus reducing manufacturing cost.

Technical Solution

Moreover, the present invention provides an inductive angle sensor with improved common mode noise rejection, which is configured to remove common mode noise by adding and subtracting signals obtained from a pair of receiver coils and then multiplying and dividing the signals, thus improving the common mode noise rejection such as electromagnetic compatibility (EMC) characteristics.

Furthermore, the present invention provides a signal processing method of an inductive angle sensor with improved common mode noise rejection, which removes common mode noise by adding and subtracting signals obtained from a pair of receiver coils and then multiplying and dividing the signals, thus improving electromagnetic compatibility (EMC) characteristics and obtaining an accurate output value.

An exemplary embodiment of the present invention provides an inductive angle sensor with improved common mode noise rejection, the inductive angle sensor including: an exciting coil formed with a ring shape and connected to an oscillator; a coupler formed with a semicircular shape and spaced a predetermined distance from the exciting coil; a pair of receiver coils disposed between the coupler and the exciting coil and disposed symmetrically on both sides of a center line; and a signal processor connected to the pair of receiver coils to output a signal obtained adding and subtracting signals obtained from the receiver coils and then multiplying and dividing the signals.

Each of the pair of receiver coils may be composed of a single wire and formed with a semicircular shape on one side thereof and a straight line in the diameter direction.

The signal processor may include an adder adding the signals obtained from the pair of receiver coils, a subtracter subtracting the signal obtained from one of he pair of receiver coils from the signal obtained from the other receiver coil, a first multiplier multiplying the value obtained from the adder by the value obtained from the subtracter, a second multiplier multiplying the value obtained from the subtracter by itself, and a divider dividing the value obtained from the first multiplier by the value obtained from the second multiplier.

The first multiplier and the second multiplier may be connected to low pass filters, respectively.

Another embodiment of the present invention provides a signal processing method that processes signals obtained from an inductive angle sensor with improved common mode noise rejection, the inductive angle sensor including a signal processor including an adder, a subtracter, a first multiplier, a second multiplier, and a divider, the method including: adding signals obtained from a pair of receiver coils by the adder; subtracting the signal obtained from one of the pair of receiver coils from the signal obtained from the other receiver coil by the subtracter; multiplying the value obtained from the adder by the value obtained from the subtracter by the first multiplier; multiplying the value obtained from the subtracter by itself by the second multiplier; and dividing the value obtained from the first multiplier by the value obtained from the second multiplier by the divider.

According to the inductive angle sensor with improved common mode noise rejection in accordance with an exemplary embodiment of the present invention, each of the pair of receiver coils is formed with a semicircular shape and installed on the same plane, and thus it is possible to simplify the structure and reduce the number of substrates, thus reducing manufacturing cost.

Advantageous Effects

According to the inductive angle sensor with improved common mode noise rejection and the signal processing method of the same in accordance with exemplary embodiments of the present invention, it is possible to eliminate all common mode noise by a ratio-metric method of adding the signals obtained from the pair of receiver coils by the adder, subtracting the signal obtained from one of the pair of receiver coils from the signal obtained from the other receiver coil by the subtracter, multiplying the value obtained from the adder by the value obtained from the subtracter by the first multiplier, multiplying the value obtained from the subtracter by itself by the second multiplier, and dividing the value obtained from the first multiplier by the value obtained from the second multiplier by the divider, and thus it is possible to improve the electromagnetic compatibility (EMC) characteristics and obtain an accurate measurement value.

BEST MODE FOR CARRYING OUT THE INVENTION

Figure 1:
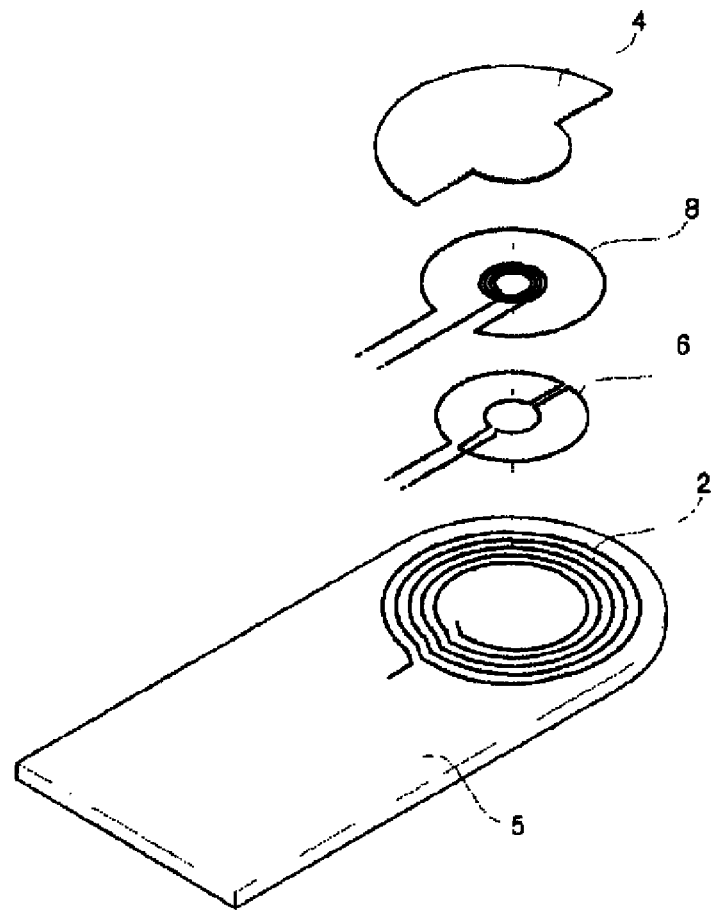
FIG. 1 is a perspective view showing a conventional inductive angle sensor.
Figure 2:
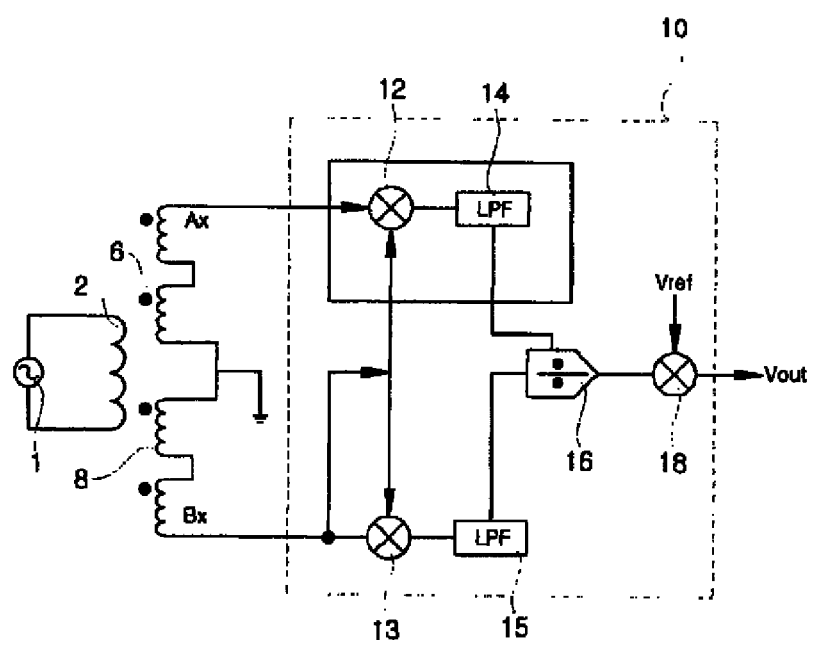
FIG. 2 is a block diagram showing a configuration of a signal processor in the convention inductive angle sensor.
Figure 3:
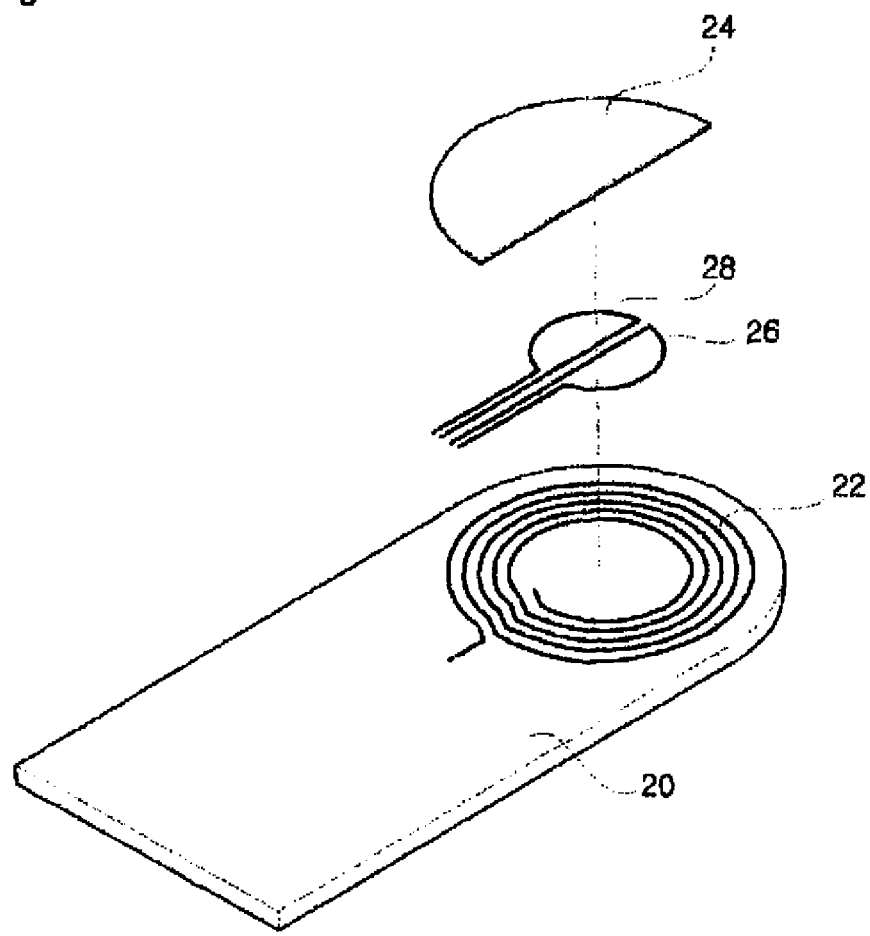
FIG. 3 is a perspective view showing an inductive angle sensor with improved common mode noise rejection in accordance with an exemplary embodiment of the present invention.
Figure 4:
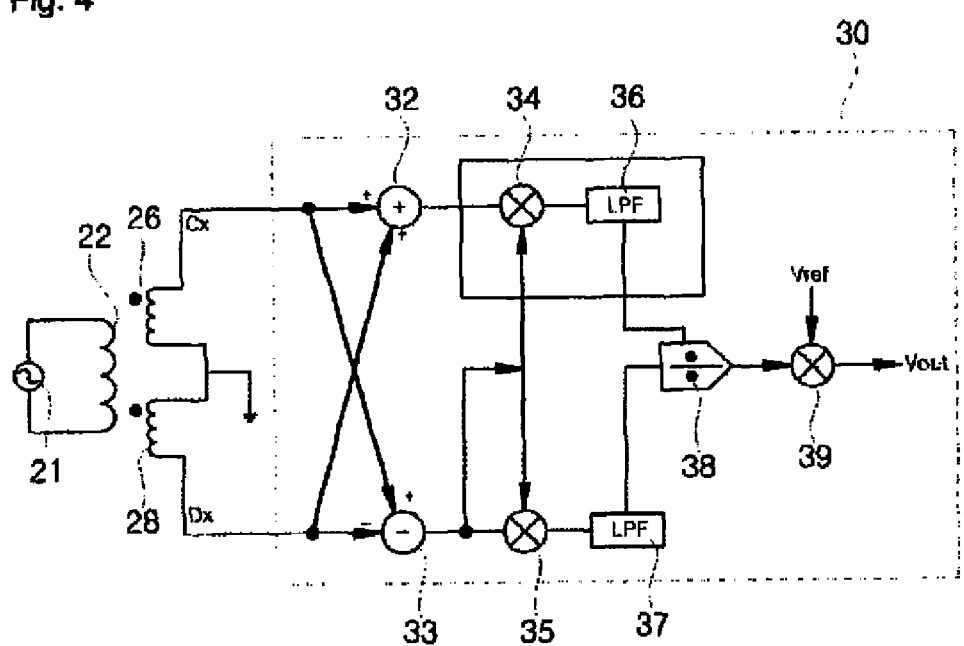
FIG. 4 is a block diagram showing a configuration of a signal processor in the inductive angle sensor with improved common mode noise rejection in accordance with an exemplary embodiment of the present invention.

Hereinafter, an inductive angle sensor with improved common mode noise rejection and a signal processing method of the same in accordance with exemplary embodiments of the present invention will be described in detail with reference to the accompanying drawings.

First, an inductive angle sensor with improved common mode noise rejection in accordance with an exemplary embodiment of the present invention includes an exciting coil 22, a pair of receiver coils 26 and 28, a coupler 24, and a signal processor 30.

The exciting coil 22 is formed with a ring shape. The exciting coil 22 is formed by winding a wire in a ring shape several times.

The pair of receiver coils 26 and 28 are spaced a predetermined distance from the exciting coil 22.

Each of the pair of receiver coils 26 and 28 is composed of a single wire.

The pair of receiver coils 26 and 28 are disposed symmetrically on both sides of a center line with a semicircular shape, respectively. For example, the first receiver coil 26 is disposed in such a manner that the semicircle is positioned on the left side and the straight line is positioned at the center, and the first receiver coil 28 is disposed in such a manner that the semicircle is positioned on the right side and the straight line is positioned at the center.

Each of the pair of receiver coils 26 and 28 is formed with a semicircular shape on one side thereof and a straight line in the diameter direction.

The coupler 24 is disposed over the exciting coil 22 with the receiver coils 26 and 28 interposed therebetween.

The coupler 24 is formed with a semicircular shape.

The coupler 24 is formed with a semicircular shape corresponding to half the size of the exciting coil 22.

The exciting coil 22 is connected to an oscillator 21.

The signal processor 30 is connected to the pair of receiver coils 26 and 28 to process the signals obtained from the receiver coils 26 and 28.

The signal processor 30 includes an adder 32, a subtracter 33, a first multiplier 34, a second multiplier 35, and a divider 38.

The adder 32 outputs a signal obtained by adding the signals obtained from the first receiver coil 26 and the second receiver coil 28.

The subtracter 33 outputs a value obtained by subtracting the signal obtained from the second receiver coil 28 from the signal obtained from the first receiver coil 26.

The first multiplier 34 outputs a value obtained by multiplying the value obtained from the adder 32 by the value obtained from the subtracter 33.

The second multiplier 35 outputs a value obtained by multiplying the value obtained from the subtracter 33 by itself.

The first multiplier 34 and the second multiplier 35 are connected to low pass filters (LPF) 36 and 37, respectively.

The first multiplier 34 and the low pass filter 36 function as a rectifier circuit.

The divider 38 outputs a value obtained by dividing the value obtained from the first multiplier 34 by the value obtained from the second multiplier 35.

The signal processor 30 may further include a third multiplier 39 multiplying the value output from the divider 38 by a reference voltage Vref and outputting an output voltage Vout.

Next, a method of processing the signals obtained from the pair of receiver coils 26 and 28 using the inductive angle sensor with improved common mode noise rejection in accordance with an exemplary embodiment of the present invention will be described.

First, when an oscillation voltage Vosc is applied from the oscillator 21 to the exciting coil 22, a first received voltage Cx and a second received voltage Dx, expressed by the following Math Figures 10 and 11, are obtained from the first and second receiver coils 26 and 28.

MathFigure 10

$$Cx = C\sin(wt) + n(t) \quad \text{[Math. 10]}$$

MathFigure 11

$$Dx = D\sin(wt-\pi) + n(t) = -D\sin(wt) + n(t) \quad \text{[Math. 11]}$$

In Math Figures 10 and 11, C and D represent constants, respectively.

Since the first receiver coil 26 and the second receiver coil 28 have a phase difference of 180° the first received voltage Cx and the second received voltage Dx also have a phase difference of 180° and the second received voltage Dx can he converted into the above Math Figure 11.

In Math Figures 10 and 11, n(t) represents common mode noise.

The adder 32 outputs a value obtained by adding the first received voltage Cx to the second received voltage Dx, which can be expressed by the following Math Figure 12.

MathFigure 12

$$Cx + Dx = (C-D)\sin(wt) + 2n(t) \quad \text{[Math. 12]}$$

The subtracter 33 outputs a value obtained by subtracting the second received voltage Dx from the first received voltage Cx, which can be expressed by the following Math Figure 13.

MathFigure 13

$$Cx - Dx = (C+D)\sin(wt) \quad \text{[Math. 13]}$$

The first multiplier 34 outputs a value obtained by multiplying the value added by the adder 32 (Math Figure 12) by the value subtracted by the subtracter 33, which can be expressed by the following Math Figure 14.

MathFigure 14

$$\begin{aligned}(Cx+Dx)(Cx-Dx) &= \{(C+D)\sin(wt) + 2n(t)\} \times \\ &\quad \{(C-D)\sin(wt)\} \\ &= (C^2 - D^2)\sin^2(wt) + \\ &\quad (C-D)\sin(wt) \cdot 2n(t)\end{aligned} \quad \text{[Math. 14]}$$

In Math Figure 14, since $\sin^2(wt)$ is expressed by the above Math Figure 5 according to a trigonometric function equation, the above Math Figure 14 can be expressed by the following Math Figure 15.

MathFigure 15

$$(Cx + Dx)(Cx - Dx) = \frac{(C^2 - D^2)(1 - \cos(2wt))}{2} + (C - D)\sin(wt) \cdot 2n(t) \quad [\text{Math. 15}]$$

When the low pass filter 36 is connected to the first multiplier 34, all cos(2 wt) and sin(wt) components are removed, and Math Figure 15 can be expressed by the following Math Figure 16.

MathFigure 16

$$(Cx + Dx)(Cx - Dx) = \frac{C^2 - D^2}{2} \quad [\text{Math. 16}]$$

In the same manner when the value obtained from the subtracter 33 is provided from the second multiplier 35 and passed through the low pass filter 37, a value expressed by the following Math Figure 17 is output.

MathFigure 17

$$(Cx - Dx)(Cx - Dx) = \frac{(C + D)^2}{2} \quad [\text{Math. 17}]$$

As can be seen from Math Figures 16 and 17, most common mode noise, which is not synchronized, is removed by the rectifier circuit, thus not affecting the ratio-metric output.

The divider 38 outputs a value obtained by dividing the value obtained from the first multiplier 34 by the value obtained from the second multiplier 35, which can be expressed by the following Math Figure 18.

MathFigure 18

$$\frac{C^2 - D^2}{(C + D)^2} = \frac{(C + D)(C - D)}{(C + D)(C + D)} = \frac{C - D}{C + D} \quad [\text{Math. 18}]$$

In Math Figure 18, since C and D have the same quantity and vary in the opposite manner by the polarities of the first receiver coil 26 and the second receiver coil 28, the term C−D indicates angle information and the term C+D is constant.

Therefore, (C−D)/(C+D) is a ratio-metric output value.

The third multiplier 39 outputs a final output value Vout by multiplying the ratio-metric output value by the reference voltage Vref.

When the signal is processed in the above-described manner, it is possible to prevent the electromagnetic compatibility (EMC) characteristics from being deteriorated by the coil serving as an antenna, which is one of the problems of the inductive angle sensor. Moreover, since most common mode noise is cancelled and removed when the signal is processed and most noise generated in the electromagnetic compatibility is the common mode noise, the electromagnetic compatibility characteristics are significantly improved by the noise cancellation.

While the inductive angle sensor with improved common mode noise rejection and the signal processing method of the same have been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. An inductive angle sensor with improved common mode noise rejection, the inductive angle sensor comprising:
    an exciting coil formed with a ringshape and connected to an oscillator;
    a coupler formed with a semicircular shape and spaced a predetermined distance from the exciting coil;
    a pair of receiver coils disposed between the coupler and the exciting coil and disposed symmetrically on both sides of a center line; and
    a signal processor connected to the pair of receiver coils to output a signal obtained by adding and subtracting signals obtained from the receiver coils and then multiplying and dividing the signals,
    wherein the signal processor comprises an adder adding the signals obtained from the pair of receiver coils, a subtracter subtracting the signal obtained from one of the pair of receiver coils from the signal obtained from the other receiver coil, a first multiplier multiplying the value obtained from the adder by the value obtained from the subtracter and connected to a low pass filter, a second multiplier multiplying the value obtained from the subtracter by itself and connected to a low pass filter, and a divider dividing the value obtained from the first multiplier by the value obtained from the second multiplier.

2. A signal processing method that processes signals obtained from the inductive angle sensor with improved common mode noise rejection of claim 1, the inductive angle sensor comprising a signal processor including an adder, a subtracter, a first multiplier, a second multiplier, and a divider, the method comprising:
    adding signals obtained from a pair of receiver coils by the adder;
    subtracting the signal obtained from one of the pair of receiver coils the signal obtained from the other receiver coil by the subtracter;
    multiplying the value obtained from the adder by the value obtained from the subtracter by the first multiplier;
    multiplying the value obtained from the subtracter by itself by the second multiplier; and
    dividing the value obtained from the first multiplier by the value obtained from the second multiplier by the divider.

3. The signal processing method of claim 2,
    wherein the value obtained by the first multiplier multiplying the value obtained from the adder by the value obtained from the subtracter is passed through a low pass filter to be filtered, and
    the value obtained by the second multiplier multiplying the value obtained from the subtracter by itself is passed through a low pass filter to be filtered.

* * * * *